US012586559B2

(12) United States Patent
Botschen et al.

(10) Patent No.: US 12,586,559 B2
(45) Date of Patent: Mar. 24, 2026

(54) METHOD AND APPARATUS FOR GENERATING SPEECH OUTPUTS IN A VEHICLE

(71) Applicant: MERCEDES-BENZ GROUP AG, Stuttgart (DE)

(72) Inventors: Teresa Botschen, Althengstett (DE); Stefan Ultes, Walsdorf (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 119 days.

(21) Appl. No.: 18/570,168

(22) PCT Filed: Jun. 1, 2022

(86) PCT No.: PCT/EP2022/064948
§ 371 (c)(1),
(2) Date: Dec. 14, 2023

(87) PCT Pub. No.: WO2022/263179
PCT Pub. Date: Dec. 22, 2022

(65) Prior Publication Data
US 2024/0282290 A1 Aug. 22, 2024

(30) Foreign Application Priority Data
Jun. 15, 2021 (DE) ..................... 10 2021 003 074.5

(51) Int. Cl.
*G10L 13/027* (2013.01)
*G06V 20/59* (2022.01)
(Continued)

(52) U.S. Cl.
CPC ............ *G10L 13/027* (2013.01); *G06V 20/59* (2022.01); *G10L 15/1815* (2013.01);
(Continued)

(58) Field of Classification Search
CPC .............................. G10L 13/027; G06V 20/59
See application file for complete search history.

(56) References Cited

U.S. PATENT DOCUMENTS 7,752,546 B2 * 7/2010 Mannheimer ........ G11B 27/002
715/810
10,629,207 B2 * 4/2020 Min ........................ G10L 15/26
(Continued)

FOREIGN PATENT DOCUMENTS

DE 102015213722 A1 1/2017
DE 102018200746 A1 7/2019
(Continued)

OTHER PUBLICATIONS

International Search Report and Written Opinion mailed Sep. 8, 2022 in related/corresponding International Application No. PCT/EP2022/064948.
(Continued)

*Primary Examiner* — Kevin Ky
(74) *Attorney, Agent, or Firm* — PATENT PORTFOLIO BUILDERS PLLC

(57) ABSTRACT

A method for generating speech outputs in a vehicle in response to a speech input involves recording, in addition to the speech input, additional information by at least one sensor. Afterwards an analysis of the speech input and the sensor data is performed and which is used as a basis for the speech output. At least one imaging sensor is used as the at least one sensor and it records the passenger compartment. Identified objects or people are assigned to predetermined categories. The speech output is produced based on the analysis results and is enriched with keywords or formulations matching one of the categories.

11 Claims, 1 Drawing Sheet

Figures 1, 2, 3, 4, 5:
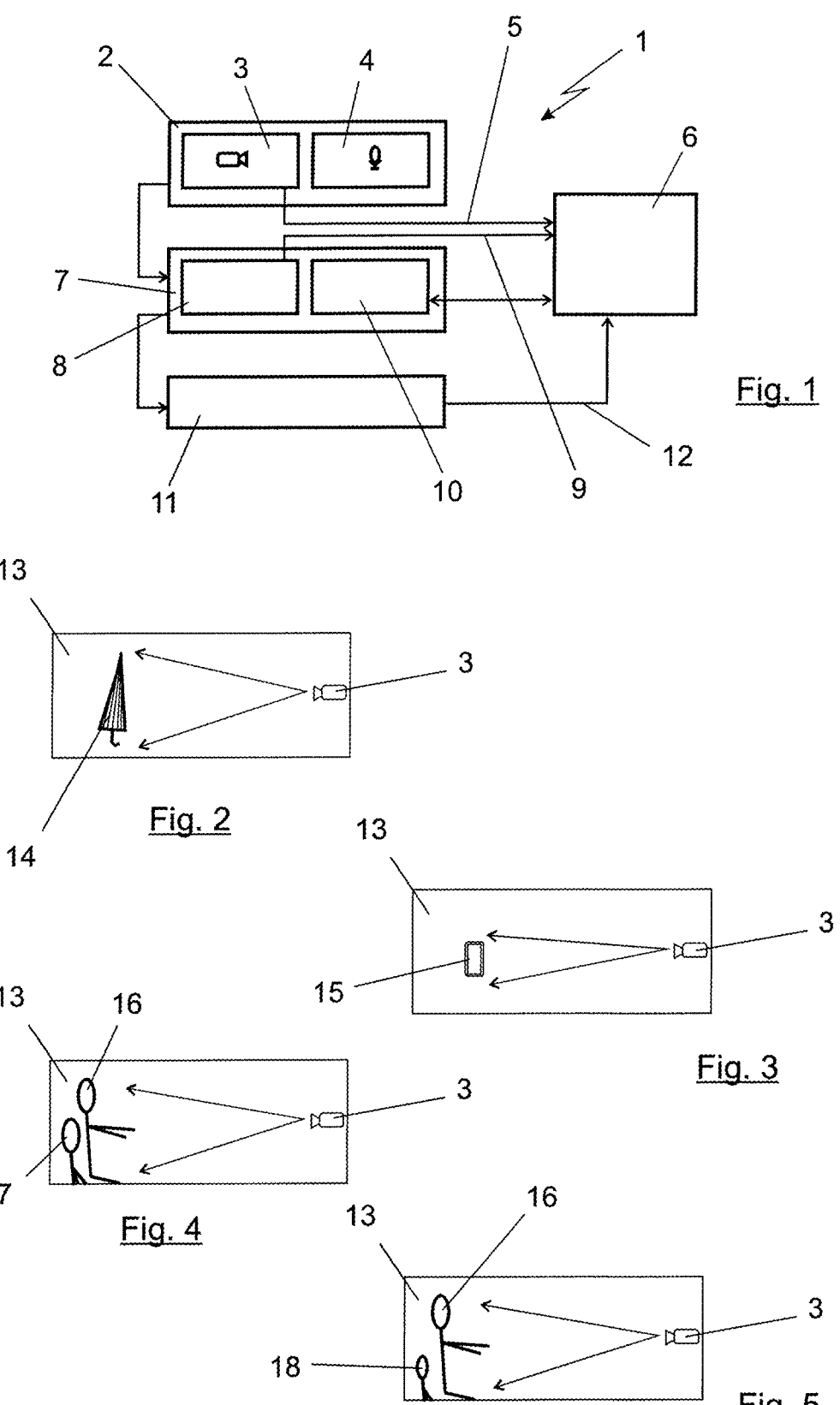

(51) Int. Cl.
    *G10L 15/18*     (2013.01)
    *G10L 15/22*     (2006.01)
    *G10L 15/24*     (2013.01)
    *G10L 15/30*     (2013.01)

(52) U.S. Cl.
    CPC .............. *G10L 15/22* (2013.01); *G10L 15/24* (2013.01); *G10L 15/30* (2013.01)

(56)           References Cited

U.S. PATENT DOCUMENTS

| | | | | |
|---|---|---|---|---|
| 2005/0152519 | A1* | 7/2005 | Rush | .................. H04L 12/2854 |
| | | | | 379/101.01 |
| 2008/0269958 | A1 | 10/2008 | Filev et al. | |
| 2014/0324429 | A1 | 10/2014 | Weilhammer et al. | |
| 2019/0051302 | A1* | 2/2019 | Gonzalez | ............... G06V 20/59 |
| 2019/0156222 | A1* | 5/2019 | Emma | .................... G06N 5/041 |
| 2019/0202063 | A1 | 7/2019 | Shukla | |
| 2020/0279553 | A1 | 9/2020 | Mcduff et al. | |
| 2021/0110815 | A1 | 4/2021 | Maeng | |
| 2021/0297494 | A1* | 9/2021 | Kaplan | ................. G06F 9/4881 |
| 2021/0343275 | A1* | 11/2021 | Lee | .................... B60R 11/0247 |
| 2024/0282290 | A1* | 8/2024 | Botschen | ............ G10L 15/1815 |

FOREIGN PATENT DOCUMENTS

| | | |
|---|---|---|
| DE | 102018215293 A1 | 3/2020 |
| DE | 102019217751 A1 | 5/2021 |
| EP | 2051241 A1 | 4/2009 |
| KR | 20190066537 A | 6/2019 |

OTHER PUBLICATIONS

Office Action created Jan. 20, 2022 in related/corresponding DE Application No. 10 2021 003 074.5.

Office Action dated Apr. 11, 2025 in related/corresponding KR Application No. 10-2023-7041672.

Office Action dated Nov. 24, 2025 in related/corresponding KR Application No. 10-2023-7041672.

\* cited by examiner

METHOD AND APPARATUS FOR GENERATING SPEECH OUTPUTS IN A VEHICLE

BACKGROUND AND SUMMARY OF THE INVENTION

Exemplary embodiments of the invention relate to a method for generating speech outputs in a vehicle in response to a speech input, as well as to an apparatus for multimodal speech communication with the user of a vehicle.

Speech dialogue systems in vehicles are already known, for example from the prior art. They comprise typically a device for the recording of speech in the surroundings, which comprises at least one microphone. Typically, it is the case that the speech recognition starts at the touch of a button or via a code word and the speech input is accordingly analyzed in order to recognize the desired content of the speech input and to react with a suitable action and/or speech output. EP 2 051 241 A1 describes such a speech dialogue system, wherein a speech input is evaluated by a speech evaluation system and speech is output via a speech output system in response to the input. In addition, the speech output is adapted according to further information in the environment recorded by a sensor. However, this can be the output speed, the volume, or similar. This can, for example, also comprise the geographical position of the vehicle, the traffic situation, or similar. The information, which is recorded via the sensor system, is then used to adapt the speech output.

Exemplary embodiments of the present invention are directed to a further improved method and a suitable apparatus for carrying out the method, which enables an improved generation of speech output in a vehicle.

The method according to the invention is used for generating speech outputs in a vehicle. The speech outputs occur in this case as a response to a speech input. Compared to the prior art, both the speech input and also at least one additional piece of information recorded via a sensor are analyzed. The analysis result is then used as the basis for the speech output. According to the invention, at least one imaging sensor is used. The passenger compartment is recorded via such an imaging sensor, wherein recorded objects and/or people are analyzed and assigned to predetermined categories. These categories then serve to enrich the speech output, which is produced based on the analysis result of the speech input, with keywords or formulations that match the appropriate category. The matching keywords are preferably connected semantically with the speech output and saved as belonging to the category. The keywords can comprise individual words, a phrase or full sentence.

A multimodal speech generation system can thus be provided via the method according to the invention. This can then react to a request from a user, for example for the current weather, by for example generating the expected output and informing the user about the weather. For example, such a speech output can contain the content "It is sunny today; the weather is nice". In addition, an object such as an umbrella can be recognized in the vehicle by corresponding image analysis via the imaging sensor, which in particular is the interior camera of the vehicle. This is then assigned into a corresponding category, here for example "umbrella" or the other category "rain gear." The speech output can now be enriched in the method according to the invention by appending to the objective information about the weather, for example, the comprehensive sentence "So you won't need your umbrella", which is stored in the rain gear category and semantically and/or logically linked to the speech output. The feeling of "human" communication is hereby conveyed to the user of the speech generation system, which in effect enhances the voice control for the user.

Further categories for objects could be, for example, bags, mobile devices such as smart phones or similar. Other categories could for example comprise people, in particular the number of people, if the person is an adult or a child or similar. All this then enables a speech output that goes beyond enrichments that are purely oriented to the speech content and enables enrichments that are directly related to the user.

According to an additional very advantageous embodiment of the method according to the invention, it can be provided that a semantic analysis of the connection between the analysis result and the predetermined, stored categories and/or keywords occurs, wherein the categories semantically connected with the analysis result of the speech input, i.e., with the speech output, and keywords preferably semantically connected with the analysis result of the speech input in a corresponding category are used for enriching the speech output. For example, the aforementioned category of the rain gear is connected with the topic weather or corresponding categories, which include people, can be linked, for example, to topics such as searching for a restaurant/ hotel, room reservations/table reservations and similar. Additionally, semantically matching keywords or sentences are preferably selected in the category semantically linked to the speech output, i.e., for example for speech output corresponding to nice weather the semantically linked key words would be "You will not need your umbrella", for speech output corresponding to bad weather however, the semantically linked key words would be "You will need your umbrella".

A further very advantageous embodiment of the method according to the invention therefore provides that semantically similar keywords from a database are assigned to categories and are used for the enrichment of the speech output. For example, keywords and/or phrases matching the respective category can be kept in a database or retrieved on-line and assigned to the respective category. Inside of the database, if a category is recognized, the keywords and formulations in the database that match this category can be used in order to perform the enrichment of the speech output.

Without needing to go into further detail, it should be clear for a person skilled in the art that the actual speech input is changed here into a text format, in order to be accordingly analyzed. In addition, the speech output and the enrichments provided for it according to the invention are also saved and stored according to the text format and are combined with each other in the text format, in order to then output them as speech.

According to a particularly expedient embodiment of the inventive method, this is formed as a self-learning system. Via a sensor system, and here in particular also the microphone and/or the interior camera of the vehicle, the verbal and/or visual reaction of a vehicle user to the speech output is recorded and analyzed. The reaction is then classified as a positive or negative reaction, in order to determine if the enrichment is perceived as positive, funny, entertaining, or similar by the person using the system, or if this rather annoys and/or stresses the user of the system. Depending on the result, the corresponding speech enrichment is then adapted. In the case of positive feedback, associated speech enrichments are used more often in future and in the case of negative feedback, associated speech enrichments are used less in the future, no more or at most at lower frequency. Preferably, the reaction is taught by means of a method of machine learning, for example a neural network, so that a reaction to an enrichment or to a category of the enrichment can be predicted depending on the user. The method according to the invention enables the respective multimodal speech generation system to adapt to its user and to shape the communication with the user in such a way that the user perceives this as positive and pleasant.

According to a further very advantageous embodiment of the method according to the invention, the speech outputs are stored, wherein a newly generated speech output is compared with at least one or more recently stored speech outputs in a category which is assigned to the same semantic field before its output. In the case of a match, the speech output is discarded and is replaced by another one. In every category with the same semantics, the speech outputs or at least the enrichments are accordingly stored, in order to be able to create a comparison to the most recent output. This enables the system to generate different speech outputs and in particular generate different enrichments, in order to not always communicate with the same speech output and the same enrichment, which makes the communication very predictable and therefore is perceived as boring and artificial by a user.

In particular, it can be provided that, for every category with the same semantics, a predetermined number of the most recent speech outputs is stored in each case and is considered in the comparison. For example, the last 10 to 20 speech outputs in the category with the same semantics can be stored, in order to allow a first more or less word-identical repetition after this number at the earliest. The storage can therefore take place in such a way that the most recent speech output is accordingly stored in a type of stack memory and therefore the oldest speech output in the system is correspondingly dropped out or is deleted. Such a storage method, also known as first in first out, is ideal for the implementation of this embodiment of the method according to the invention and enables the multimodal language generation system to result in communication that is perceived as realistic and intelligent by a user, which increases the acceptance of the corresponding system.

A further extremely favorable development of the method according to the invention can therefore further provide that in addition, a situation surrounding the vehicle is recorded, wherein a degree of the enrichment of the speech output is adapted depending on the situation surrounding the vehicle, in particular the traffic conditions. The surrounding situation comprises, for example, traffic data, weather data, hazardous objects, recognized emergency situations. The surrounding situation is determined via sensors of the vehicle and/or via data available on a vehicle data bus, for example traffic information or weather information made available via a server. The degree of enrichment is understood to mean, for example, the number of keywords, length or complexity of the sentences formed by the keywords and/or also a distinction between informative or entertaining information. For example, during a drive on a multi-lane street with a lot of free-flowing traffic and frequent lane changing, the degree of enrichment can be set very low or an enrichment can be completely omitted. The communication in this situation, in which a driver of the vehicle must, above all, concentrate on the surroundings and the traffic, is restricted to an absolute minimum and the desired information is transmitted in a very factual manner. The less attention the traffic situation requires, the stronger and greater the degree of enrichment can be. For example, if a person is at a standstill with their motor vehicle in traffic, the system can be operated with a very high degree of enrichment in order to achieve an entertaining effect for the person. The danger of a distraction is less likely to cause a safety-critical distraction than in the previously explained very complex surrounding situation.

According to an extremely advantageous development of the method according to the invention, it can be provided that the degree of enrichment ranges from no enrichment to at least one intermediate stage to a strong enrichment, wherein the degree of enrichment is smaller, the more complex the situation, and in particular again the traffic situation, surrounding the vehicle is.

Alternatively, or in particular in addition to, varying the degree of enrichment according to the surrounding situation, the user can also adjust a control element, in order to determine the degree of enrichment. The control element for example can be designed as a slider, rotary knob or as a touch display, which each comprise a choice of different stages of enrichment. This applies in principle for every type of visually based enrichment, but can serve, in particular, for an enrichment without real informational content, which therefore only serves for entertainment purposes. This type of enrichment is also known as chitchat. The user can, for example, then set a factual mode or an entertainment mode via a menu setting, for example by preselecting a suitable degree of enrichment using different stages or the slider, in particular a virtual slider. This can then, in particular, be combined with the aforementioned embodiment variants in relation to the enrichment in response to the surrounding situation, so that even if a very entertaining mode has been preselected, in the case of a difficult surrounding situation, for example a complex traffic situation, the entertaining elements can be completely or mostly omitted.

The apparatus according to the invention for the multimodal speech communication with the users of a vehicle therefore comprises at least one microphone for recording speech inputs and comprises at least one sensor for recording additional information. The apparatus has furthermore a speech output and at least one control device for the named components. The control device can therefore be divided into several parts or also be a part of a larger control device, which is used for controlling the mentioned components only in part.

According to the invention, the control device is designed for carrying out a method in one of the aforementioned embodiments. As previously explained, it can be provided that the at least one sensor comprises at least one interior camera. Via such an interior camera, the people and the objects assigned to them, which have been brought into the vehicle, can then be accordingly directly recorded, and this is transmitted to the control device for analysis and assignment into categories. The control device generates the speech output based on the analysis result of the speech input and enriches this with keywords or formulations that match one of the categories. Matching keywords should be understood as keywords that are semantically linked with the speech output and belong to a category semantically linked with the speech output.

Additional advantageous embodiments and developments of the method according to the invention and of the apparatus, which in particular can be formed as a part of a vehicle, result also from the exemplary embodiment, which is described in more detail below with reference to the figures.

BRIEF DESCRIPTION OF THE DRAWING FIGURES

Shown here are:

FIG. 1 a schematic sketch of a multimodal speech generation system;

FIGS. 2 to 5 different application examples for the system.

DETAILED DESCRIPTION

In the representation of FIG. 1, a multimodal speech generation system is sketched in a top view, which is suitable for the implementation of the method according to the invention. The system 1 comprises a pre-processing system 2, which comprises a visual sensor 3, here an interior camera of a vehicle, as well as a microphone 4. These form on the one hand a visual data source, which can be used for the detection of different objects. Thus, for example umbrellas, bags, phones, adults, children, and dogs or similar can be recognized. These categories, also referred to as "instances", are therefore objects or people that are not a part of the interior of the vehicle, so are currently brought into the vehicle by the vehicle users. The microphone 4 serves as a speech data source. Spoken text can be identified as speech input, for example after a code word is said, which can for example be "Hey Mercedes" in the case of the applicant. Additionally, or alternatively, other code words or the push of a button are naturally also possible for the activation of the speech input. The captured speech expressions of the user are then transferred into a text format and are recognized via a corresponding text recognition and evaluated in terms of the content, as is known already from the prior art. For example, a question about the current weather can have been asked, so that from an analysis of the speech data source, a question concerning weather information has been recognized.

According to the connection marked 5, the visual instances recorded in parallel now reach a memory 6, in which these instances are stored in the text format. The memory 6 therefore administers a list of the instances, for example umbrella, phone or similar.

Initiated by the pre-preparation system 2, a semantic analysis of the connection between the visual situation, which has been recorded by the interior camera 3 as an optical sensor, and the speech expressions of the user recorded via the microphone 4 then takes place. In a component 8 for the semantic enrichment, the list of the instances is then gone through, whereby semantically similar keywords and formulations, so-called associations, are saved for each instance. For example, for an identified object "umbrella", keywords such as rain, sun, sunshine, protection and wet or similar can be saved. The keywords can be generated by a semantic search in corresponding knowledge sources, for example in WordNet, Wikidata, or similar. In addition, the definitions of the instance stored in the sources can be consulted, for example for the keyword "umbrella" from Wikidata: "An umbrella is a canopy for protection from the rain or sunlight". These keywords and information are then transferred again into the memory 6, as indicated here by the step marked 9.

A further component 10 of the semantic analysis unit 7 serves for the evaluation concerning matches. This component 10 continually evaluates the situation-related match between newly expressed content and the visual instance in the memory 6. An example could be that the expression "Hey Mercedes, how is the weather?" is connected with the content "Question about weather information". According to the keywords in the memory 6 there is now a high semantic similarity with the previously shown umbrella instance. The semantic analysis unit 7 then informs a speech generation module 11 that the umbrella can be included in the answer for the aforementioned example. In the speech generation module 11, the speech answer is generated in the text format, which is then converted into speech via a conversion and output in a known manner.

The easiest embodiment selects predefined answer sentences containing the matching instance. A new answer sentence referring to the instance in question can also be generated for more variations via a speech generation approach. In a step marked as 12, it is then transferred to the memory 6 which of the visual instances were used with which formulation. Duplications within a relatively quick succession of speech outputs in relation to the same instances can be avoided.

An increased spectrum of helpful information, which can be shared through speech with the user, is made available through the system 1. Through the image analysis via the interior camera 3, contextual information is accessible, which could not have been generated from the speech analysis alone. For example, recognizable characteristics of people in the vehicle, for example whether they are an adult or a child. This additional information can then be included in the processing of the shared speech commands. This leads to an increase of the perceived authenticity of the dialogue, furthermore it allows the involvement of chitchat elements, e.g., speech enrichment without direct informative content, in order to break up the dialogue accordingly, in particular if the situation surrounding the vehicle allows for it, without impairing the concentration of the user on the traffic. Generally, this leads to an increased perceived intelligence of the system 1, which also ultimately promotes the authenticity of the dialogue and therefore ultimately increases the acceptance of the system 1 by the user.

According to the following FIGS. 2 to 5, some situations will now be explained in relation to their speech enrichments according to more concrete examples.

According to a first possibility, pure entertainment elements could be generated with visual references as enrichment. An example could be the situation represented in FIG. 2. In this case, the camera 3 can be seen inside a passenger compartment marked in its entirety as 13. An umbrella marked as 14 is recognized as an object via the camera 3. To a question about the weather, such as the aforementioned example, the speech output could include "The sun is shining" as a necessary part of the output and could, with reference to the umbrella 14 as an instance, add the enrichment "you will not need your umbrella". This would be an example for a purely entertaining element which, however, appears very natural due to the inclusion of the umbrella 14 detected via the visual sensor in the form of the camera 3.

In the embodiment in FIG. 3, another situation is represented. The interior camera 3 identifies, for example, a mobile phone 15 lying in the open in the middle console in the passenger compartment 13 of the vehicle. In a situation in which the order "Please, park the car" is output via the speech input and the microphone 4, this order is then carried out and the vehicle is accordingly parked. Simultaneously, helpful information can be output to the user as speech output, in which the user is told "Warning, your mobile phone is visible in the middle console." The user can also be told not to forget their mobile phone after parking, if they leave the vehicle, or at least position it in the vehicle such that it cannot be seen from outside, in order to avoid the danger of vandalism and theft due to the mobile phone being visible in the vehicle.

Another conceivable possibility is that, in addition to objects, people are also included. This can for example comprise the reservation in a restaurant. In the embodiment in FIG. 4 two people recognized by the interior camera 3 are located in the passenger compartment 13, one person 16 driving the vehicle as well as one person 17 sat in a passenger seat. Both people are recognized as adults and assigned to the corresponding category. In response to a speech command "go to a restaurant", a speech output along the lines of "Yes of course, I am making a reservation for two people at restaurant XY" could be given. The system 1 can therefore react immediately to the persons 16, 17 located in the vehicle and perform or at least offer to perform a further action related to the persons or their number and/or property without further prompting.

An alternative scenario can be seen in the depiction in FIG. 5. The only difference to the scenario in FIG. 4 is that instead of an adult person 17, a child 18 is now recognized. In the same situation, in which the speech command "go to a restaurant" is given, the answer could now be "OK, I am searching for a child-friendly restaurant". Here, the system 1 again responds to the specific situation recorded by the visual sensor in the form of the interior camera 3 and reacts to the corresponding situation and the voice input in a supposedly "intelligent and human-like" manner for the user. In order to offer the user the option of responding, the speech output could also be formulated as a question, "OK, should I search for a child-friendly restaurant?" to which the user could then reply for example with "Yes, please."

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for the generation of a speech output in a vehicle responsive to a speech input, the method comprising:

recording the speech input;

recording, using at least one imaging sensor, additional information in a passenger compartment of the vehicle;

analyzing the recorded speech input and the recorded additional information, wherein the analysis of the recorded additional information comprises analyzing objects in the additional information and assigning the analyzed objects to at least one predetermined category of a plurality of predetermined categories;

recording a situation surrounding the vehicle via sensors of the vehicle or the vehicle obtaining data regarding the situation surrounding the vehicle from an external server; and generating the speech output based on the analysis of the recorded speech input and additional information, wherein the generated speech output is enriched with keywords or formulations matching one of the predetermined categories, wherein a degree of the enrichment of the generated speech output is adapted depending on the situation surrounding the vehicle, wherein the adaptation of the degree of enrichment ranges from no enrichment to at least one intermediate stage to a strong enrichment, and wherein the adaptation of the degree of enrichment is adapted based on a complexity of the surrounding situation, wherein the adaptation of the degree of enrichment is less when the complexity of the surrounding situation is high than when the complexity of the surrounding situation is low.

2. The method of claim 1, wherein the analysis of the recorded speech input and the recorded additional information further comprises a semantic analysis of a connection between an analysis result of the recorded speech input and the assigned at least one category, wherein categories or keywords semantically connected to the analysis result of the speech input are used for enriching the generated speech output.

3. The method of claim 2, wherein semantically similar keywords from a database are assigned to the plurality of predetermined categories and the semantically similar keywords used for the enrichment of the generated speech output.

4. The method of claim 1, further comprising:

recording a verbal or visual reaction of a user to the generated speech output; and classifying the recorded verbal or visual reaction as a positive or negative reaction, wherein speech enrichments are adapted to the classification of the recorded verbal or visual reaction as the positive or negative reaction.

5. The method of claim 1, further comprising:

storing the generated speech outputs, wherein a newly generated speech output is compared with at least one of a recently stored speech output in a category with same semantics before the output and when there is a close match between the newly generated speech output and the at least one recently stored speed output, the newly generated speech output is discarded.

6. The method of claim 5, wherein, for every category with a same semantics, a predetermined number of most recent generated speech outputs is stored.

7. The method of claim 1, wherein the analysis of the recorded additional information further comprises analyzing people in the additional information and assigning the analyzed people to at least one predetermined category of the plurality of predetermined categories.

8. An apparatus for multimodal speech communication with a user of a vehicle, the apparatus comprising:

at least one microphone configured to record speech input by the user;

at least one imaging sensor configured to record additional information in a passenger compartment of the vehicle;

sensors configured to record a situation surrounding the vehicle; and a control device coupled to the at least one microphone and the at least one imaging sensor, wherein the control device is configured to analyze the recorded speech input, the recorded additional information, and, wherein the analysis of the recorded additional information comprises analyzing objects in the additional information and assigning the analyzed objects to at least one predetermined category of a plurality of predetermined categories; and generate a speech output based on the analysis of the recorded speech input and additional information, wherein the generated speech output is enriched with keywords or formulations matching one of the predetermined categories, wherein a degree of the enrichment of the generated speech output is adapted depending on the situation surrounding the vehicle, wherein the adaptation of the degree of enrichment ranges from no enrichment to at least one intermediate stage to a strong enrichment, and wherein the adaptation of the degree of enrichment is adapted based on a complexity of the surrounding situation, wherein the adaptation of the degrees of enrichment is less when the complexity of the surrounding situation is high than when the complexity of the surrounding situation is low.

9. A method comprising:

recording, by a vehicle microphone, a speech input;

recording, by an imaging sensor of the vehicle, a passenger compartment of the vehicle;

identifying, by the vehicle, objects in the recording of the passenger compartment;

assigning, by the vehicle, the identified objects to at least one predetermined category of a plurality of predetermined categories;

determining, by semantic analysis of the at least one predetermined categories to which the identified objects are assigned and the recorded speech input, a connection between the at least one predetermined categories to which the identified objects are assigned and the recorded speech input;

determining, by the vehicle, a situation surrounding the vehicle via sensors of the vehicle or via data regarding the situation surrounding the vehicle obtained from an external server;

determining, based on the determined situation surrounding the vehicle, a degree of enrichment of a generated speech output, wherein the determined degree of enrichment is less when complexity of the situation surrounding the vehicle is high than when the complexity of the situation surrounding the vehicle is low;

selecting, based on the recorded speech input, a speech output;

selecting, based on the determined degree of enrichment and on the connection between the at least one predetermined categories to which the identified objects are assigned and the recorded speech input, keywords or formulations matching one of the predetermined categories;

merging the speech output with the selected keywords or formulations to generate an enriched speech output; and audibly outputting, by the vehicle, the enriched speech output.

10. The method of claim 9, further comprising:

identifying, by the vehicle, at least one person in the recording of the passenger compartment;

assigning, by the vehicle, the identified at least one person to at least one predetermined category of the plurality of predetermined categories; and determining, by semantic analysis of the at least one predetermined categories, to which the identified at least one person is assigned and the recorded speech input, a connection between the at least one predetermined categories to which the identified at least one person is assigned and the recorded speech input, wherein the selecting the keywords or formulations matching one of the predetermined categories is further based on the connection between the at least one predetermined categories to which the identified at least one person is assigned and the recorded speech input.

11. The method of claim 9, wherein semantically similar keywords from a database are assigned to the plurality of predetermined categories and the semantically similar keywords are used for the selecting of the keywords or formulations matching one of the predetermined categories.

* * * * *